(12) United States Patent
Smith et al.

(10) Patent No.: US 7,647,333 B2
(45) Date of Patent: Jan. 12, 2010

(54) CUBE-BASED PERCENTILE CALCULATION

(75) Inventors: Richard J Smith, Seattle, WA (US); Chien-Shen Chang, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 370 days.

(21) Appl. No.: 11/766,269

(22) Filed: Jun. 21, 2007

(65) Prior Publication Data

US 2008/0320018 A1    Dec. 25, 2008

(51) Int. Cl.
G06F 7/00 (2006.01)
G06F 17/00 (2006.01)
G06F 17/30 (2006.01)

(52) U.S. Cl. ............... 707/101; 707/3; 707/4

(58) Field of Classification Search .......... 707/101
See application file for complete search history.

(56) References Cited

U.S. PATENT DOCUMENTS

| | | | | |
|---|---|---|---|---|
| 5,926,820 | A * | 7/1999 | Agrawal et al. | 707/200 |
| 6,128,473 | A | 10/2000 | Ritzen et al. | |
| 6,434,570 | B1 * | 8/2002 | Rangan | 707/104.1 |
| 6,748,092 | B1 | 6/2004 | Baekgaard | |
| 6,904,390 | B2 | 6/2005 | Nikitin et al. | |
| 7,062,447 | B1 | 6/2006 | Valentine et al. | |
| 2006/0053136 | A1 | 3/2006 | Ashiri | |
| 2006/0161456 | A1 | 7/2006 | Baker et al. | |
| 2006/0265306 | A1 | 11/2006 | Kipcak et al. | |
| 2007/0016321 | A1 | 1/2007 | Rathei | |

OTHER PUBLICATIONS

"An Overview of Data Warehousing and OLAP Technology," Chaudhuri, Surajit, Dayal, Umeshwar, SIGMOD vol. 26 issue 1 p. 65-74, ISSN: 0163-5808, Mar. 1997.*
Raatikainen, "Sequential Procedure for Simultaneous Estimation of Several Percentiles", Transactions of Society for the Computer Simulation, vol. 7, Issue 1, Mar. 1990, pp. 1-24.
Fu, "CUBIST++: A New Approach to Improving the Performance of Ad-Hoc Cube Queries", Lixin Fu, 2001, pp. 110.
"IT Management Solutions Technical Newsletter", sas, second edition, Feb. 2002, pp. 1-8.
"Oracle9i OLAP Developer's Guide to the OLAP API Release 2 (9.2)", retrieved at <<http://download-east.oracle.com/docs/cd/B10501_01/olap.920/a95297/select4.htm>> Oracle Corporation, pp. 1-7.

* cited by examiner

*Primary Examiner*—James Trujillo
*Assistant Examiner*—Bruce M Moser (57) ABSTRACT

By dividing data entries among multiple data collections, a data collection comprising a data entry associated with a requested percentile can be determined with reference to the number of data entries within each collection. Initially, the range of values corresponding to the identified data collection can be presented as the value of the requested percentile. Should further detail be required, the value for a requested percentile can be refined by averaging the range, linearly, or otherwise, extrapolating estimated values for the data entries within the identified data collection, or sorting the actual entries according to their values. A relational database can maintain the data entries, each comprising values along one or more dimensions, and an OLAP engine component can maintain a counting of the data entries within the defined data collections.

15 Claims, 5 Drawing Sheets

CUBE-BASED PERCENTILE CALCULATION

BACKGROUND

Percentile values are an often used business metric, because they are not susceptible to inordinate influence exerted by extreme values. For example, if a company, providing a network-based product, sought to ensure that 95% of their customers were provided responsive service from the network-based product, they could monitor the ninety-fifth percentile product response time. Such a value would not be affected if a couple of users experienced an abnormally long product response time, so long as those response times comprised less than five percent of all of the response times collected. Conversely, a metric such as an average value, would be disproportionally affected by anomalous entries.

The use of percentile-based metrics can require the sorting of potentially large sets of data since, as will be known by those skilled in the art, the first step in calculating a percentile value is the ordering of the relevant set of data. As will also be known by those skilled in the art, sorting a data set, whether through conventional bubble sort, selection sort, or more optimized sorting algorithms, can be a computationally expensive process. The computational cost further increases if the data set is large and if the data set is often updated with new data entries. In fact, the addition of even one data entry can require the resorting of a set of data.

SUMMARY

A data set does not need to be perfectly sorted to enable percentile calculation. The entries of a data set can be divided into collections having an upper and lower bound, such that the entries in the data set having a value between the upper and lower bounds of a given collection are placed in that collection. If the collections are ordered such that the upper bound of one collection is adjacent to the lower bound of the subsequent collection, the values of the data entries within those collections do not need to be sorted initially. Instead, a count of the number of entries in each collection can be maintained. Such a count can enable a percentile calculation to within a first degree of accuracy. More specifically, for a requested percentile, a relevant collection that comprises data entries associated with the requested percentile can be identified, based in part on the number of entries in prior collections and the overall number of entries. In one embodiment, the percentile value can be determined as simply the average between the upper and lower bound of the relevant collection.

Should further accuracy be desired, the entries within the relevant collection can be sorted, and the percentile value can be determined more precisely in a traditional manner by counting the sorted entries within the relevant collection. In an alternative embodiment, rather than sorting the entries within the relevant collection, a linear distribution of entry values can be assumed, and the percentile value can be determined based on such a linear distribution.

The maintenance of the data entries and the collections of data entries can be performed by a relational database. New data entries can be associated with an appropriate collection and can, thereby, be included in future percentile calculations without resorting all of the entries in the database. In addition, the collections can be formed along multiple dimensions, such that data entries comprising values for each dimension can be associated with an appropriate collection within each dimension. Aggregation mechanisms provided with the relational database can maintain a count of the number of data entries in the collections and in the database as a whole. Such aggregation mechanisms can further be used in conjunction with an interface providing for the specification of one or more dimensions along which the data is to be aggregated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the efficient calculation of percentile values using existing aggregation technologies often provided with relational databases. Data entries can be grouped into collections according to the value of a dimension of the data entry. If the collections are ordered along one or more dimensions, and the upper and lower bounds of the collections along each dimension are selected such that they do not overlap, nor leave gaps, then the count of the number of data entries in the collections can be used to determine a percentile value at least to a first degree of accuracy. Additional accuracy can be obtained by sorting the data entries within a relevant collection along a selected dimension, or can be obtained via assumptions regarding the distribution of data entries along that dimension within the relevant collection.

The techniques described herein focus on, but are not limited to, the use of existing aggregation technologies often provided with relational databases. Specifically, customized database solutions and aggregation mechanisms can equally be used to implement the below described embodiments. Consequently, the descriptions below are intended to convey a general description of the implementation of the described methods for efficiently calculating percentile values, and are not intended to indicate that a particular technology is required to implement the described methods, or that the described mechanisms are limited to the technology enumerated.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 1:
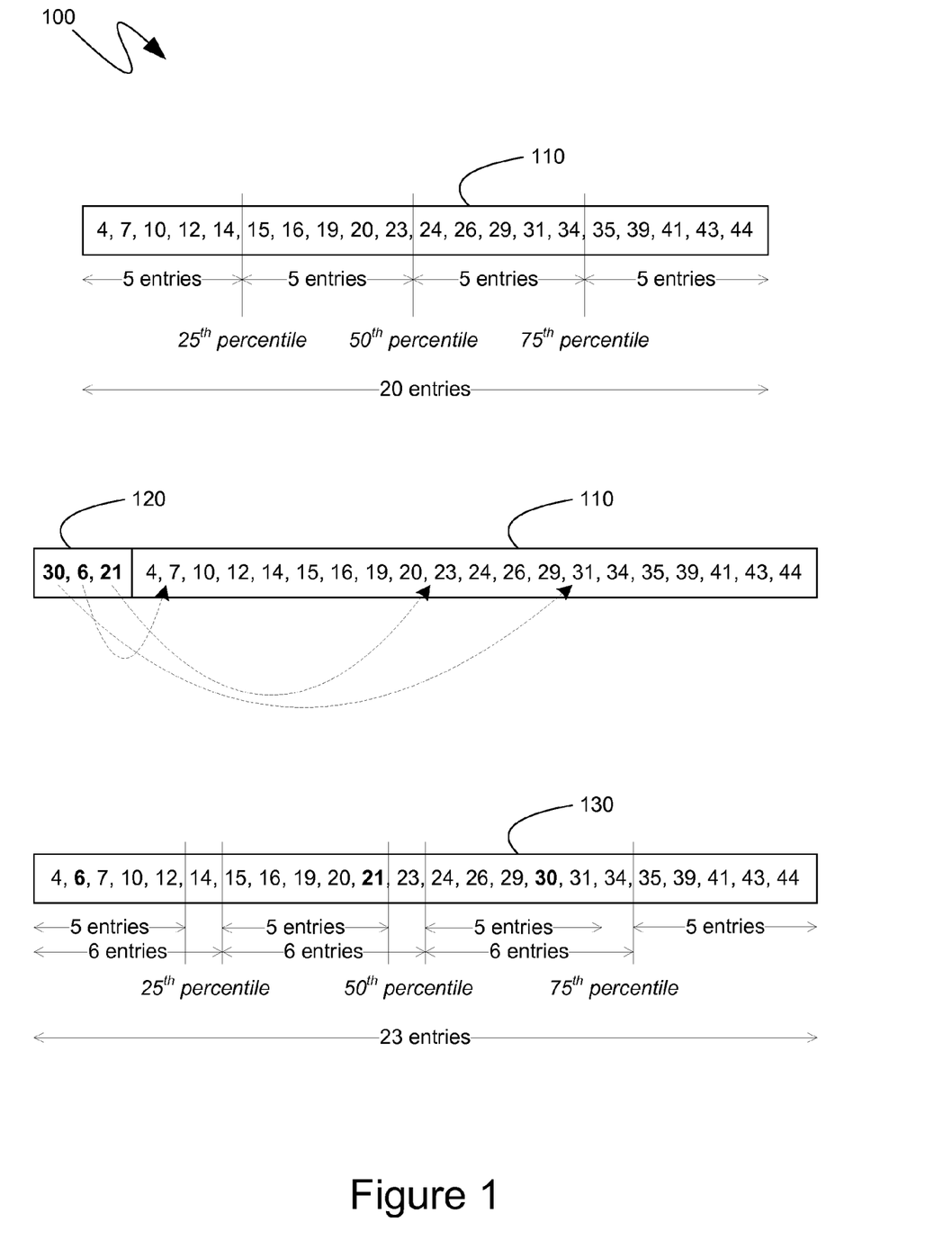
FIG. 1 is a block diagram illustrating a calculation of percentile values using sorting.

Turning to FIG. 1, collections of data 100 are shown, including an exemplary series of data entries 110. Although embodiments described below are applicable to data entries having multiple dimensions, for purposes of illustrating the concepts underpinning such embodiment, the exemplary series of data entries 110 comprises data entries having only a single dimension, namely the value indicated. As illustrated in FIG. 1, the series 110 comprises 20 entries and, for purposes of illustration, those 20 entries are shown as being ordered from least to greatest in value.

As known by those skilled in the art, a percentile value reflects the rank of that value within an ordered listing of all values. Thus, a value is said to be at, for example, the seventy-fifth percentile if 75% of all of the values in a data set are lower than that value, or, alternatively, if 75% of all of the values in the data set are lower than or equal to that value. Given a data set of 20 entries, such as the exemplary data set 110, 75% of 20 entries is 15 entries. Thus, the data entry having a value of 35 can be considered to be at the seventy-fifth percentile because 75% of all of the data entries in the data set 110 have values that are lower than 35. The data entry having a value of 34 can also sometimes be considered to be at the seventy-fifth percentile because 75% of all of the data entries in the data set 110 have values that are less than, or equal to, 34. Such a discrepancy between two equally valid definitions is often resolved by averaging the two values, or otherwise interpolating between them. Thus, the illustrated percentiles demarcated on the series 110 in FIG. 1 are shown between the two data entries that can each, depending on the definition used, be considered to correspond to the indicated percentile.

FIG. 1 also comprises a data set comprising the series of entries 110 together with new entries 120. The new entries 120 are illustrated as being appended to the entries 110, much as such entries would be added to a computer-readable structure comprising the data entries 110. In particular, and as will be known by those skilled in the art, the series of entries 110 would be maintained by a computing device within a contiguous data structure, such as an array, or a linked list. The addition of new entries, such as the new entries 120, would initially store such entries at the end of the array or linked list in the manner shown in FIG. 1. Only after such entries were stored at the end could they be sorted.

As will also be known by those skilled in the art, the sorting of entries according to their values can be a non-trivial task. Thus, while FIG. 1 illustrates, via dashed lines, the appropriate locations of each of the new entries 120 within the data set 110, the sorting of such new entries can require significantly more than a single "hop" as illustrated. Instead, the movement illustrated by the dashed lines can actually be comprised of a series of more incremental sorting of the new entries 120, with each incremental sorting requiring a comparison between the value of one of the new entries 120 and the values of adjacent entries. Consequently, for very large data sets, even a single sorting operation can consume significant processing resources. Similarly, a data set that is continually updated can likewise require significant processing resources to maintain in a sorted state, precisely because of the continual updating.

The traditional method of calculating a percentile value, however, requires such sorting. For example, if a user wished to determine the seventy-fifth percentile of the data entries 110 and 120 combined, the traditional method of calculating such a percentile value would require ordering the data entries into the ordered data entries 130, with each of the new data entries 120 sorted according to their respective values. Because the data set 130 comprises 23 entries, the seventy-fifth percentile, for example, would correspond to the entry that has seventeen-and-one-quarter entries with values either lower than, or lower than or equal to, the value of that entry. More practically, the seventy-fifth percentile value would be the eighteenth data entry, as this is the first actual data entry that satisfies the above definitions. Thus, as indicated in FIG. 1, the value of the seventy-fifth percentile of the data set 130 is 34.

To avoid resorting an entire set of data entries, and the attendant performance penalty, collections of data entries within the set can be created to maintain an approximate order. Such collections can be created such that each can have an upper bound and a lower bound, thereby defining the range of values of data entries that can be considered part of the collection. In addition, such collections can be created so that the upper bound of a collection is an immediately adjacent value to the lower bound of the next subsequent collection. In such a manner, the collections themselves can be ordered according to their upper and lower bounds, though, as will be known by those skilled in the art, once the collections are ordered, no further resorting would be required, absent a change in a collection's bounds. Individual data entries can then be associated with a collection such that the value of the individual data entry is greater than the lower bound of an associated collection, and less than the upper bound of that collection.

Figure 2:
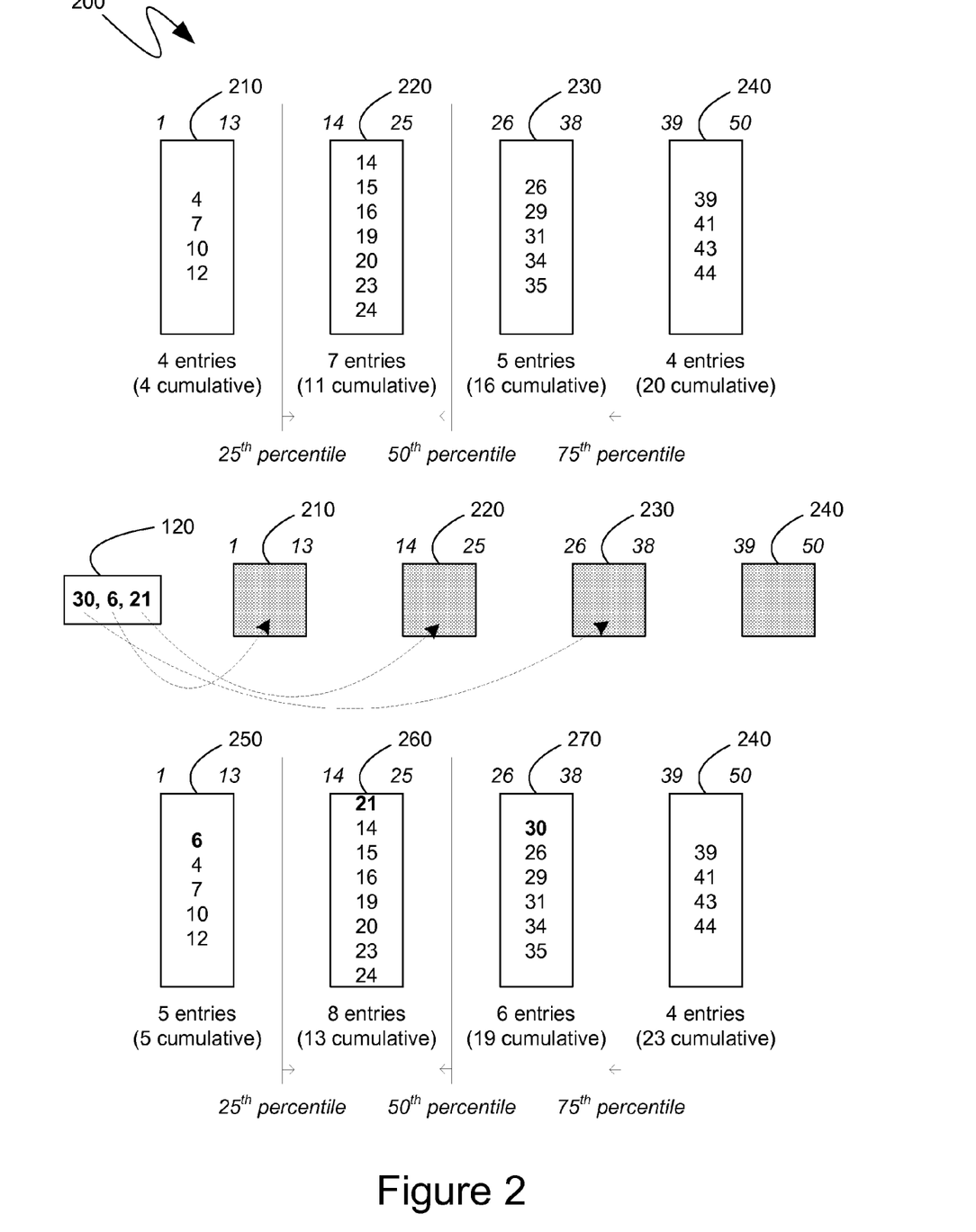
FIG. 2 is a block diagram illustrating a calculation of percentile values using collections of data.

Turning to FIG. 2, collections of data 200 are shown, including collections 210, 220, 230 and 240, which comprise the set of data entries 110 from FIG. 1. As can be seen from the figure, collection 210 can comprise those data entries from the set of data entries 110 whose values are between 1 and 13, collection 220 can comprise data entries with values between 14 and 25, collection 230 can comprise the data entries with values between 26 and 38, and collection 240 can comprise data entries with values between 39 and 50. In addition, a count can be maintained of the number of data entries within a given collection and a count of the cumulative number of data entries in the current collection and in collections comprising data entries with lower values.

Given such a division of the data entries of set 110 into collections 210, 220, 230 and 240, the integration of new data entries 120 can consume substantially less processing resources. For example, as illustrated in FIG. 2, each of the new data entries 120 can be directly added to the collections 210, 220 and 230, as indicated by the dashed arrows of FIG. 2. And unlike the sorting indicated in FIG. 1, wherein multiple operations would be required to perform each sort, the addition of a data entry to a collection can be performed in a single operation. Specifically, as illustrated by the new collections 250, 260 and 270, representing collections 210, 220 and 230 with the addition of data entries from the new data entries 120, the new data entries can simply be added to the end of the relevant collection. Thus, for example, if each collection was maintained as an array or linked list, the new data entries could simply be appended to the array, or linked to the end of the linked list, in a single basic operation.

The resulting collections 250, 260 and 270, together with the prior collection 240 that was not modified, can still provide information regarding percentile values, even though every data entry among the collections 250, 260, 270 and 280 is not sorted with respect to the other individual data entries. For example, as indicated previously, for the 23 entries of the collections 250, 260, 270 and 240, the seventy-fifth percentile, would correspond to the entry that has seventeen-and-one-quarter entries with values either lower than, or lower than or equal to, the value of that entry. Without sorting any of the collections 250, 260, 270 and 240, and merely by maintaining a count of the number of data entries in each collection, it can be determined that such an entry can be found within the collection 270. More specifically, the collection 270, having a lower bound greater than the upper bounds of collections 250 and 260, can thereby comprise those entries having higher values than the entries in collections 250 and 260. As indicated in FIG. 2, collections 250 and 260 comprise, between them, 13 entries, and collection 270 comprises an additional 6 entries. Consequently, the entries of collection 270, even though they may not be sorted amongst themselves, can be identified as the fourteenth through the nineteenth data entries as sorted by value. The data entry matching the definition for the seventy-fifth percentile can, therefore, be found within collection 270. Thus, without sorting any of the data entries within the collections 250, 260, 270 and 280, an initial value for the seventy-fifth percentile can be determined as being between the values of 26 and 38, the lower and upper bounds, respectively of the collection 270.

Depending on the particular application and need for the requested percentile value, the range of values that represent the upper and lower bounds of a relevant data collection may be sufficient. For example, if the seventy-fifth percentile value was requested for the sole purpose of ensuring that it is below a value of 40, then an indication that the seventy-fifth percentile value is between 26 and 38 is a sufficient amount of detail to definitively determine that the value is, indeed, below 40. In one embodiment, therefore, the range of values between the upper and lower limits of a collection of data can be selected such that an identification of the range in response to a percentile value calculation request comprises a sufficient amount of detail for the requester. A smaller range of values can result in a large number of collections, and can, thereby, require a greater amount of processing resources to determine an appropriate collection to which to add each new data entry. Conversely, a larger range of values between the upper and lower limits of a collection can result in a fewer number of collections and, while decreasing the amount of processing resources required to determine an appropriate collection with which to associate each new data entry, the larger range also decreases the initial accuracy with which a percentile value can be determined.

In an alternative embodiment, the range between the upper bound value and the lower bound value for a data collection can vary from collection to collection within a single data set. For example, the upper and lower bound values for a collection can be selected to initially distribute the data entries equally among the collections. Alternatively, the range of values encompassed by a data collection can be selected according to the type of data being collected and organized. For example, data whose values increase exponentially can be distributed among collections whose range likewise increases exponentially. In such cases, while the range of a data collection increases, given the nature of the data, the inaccuracy inherent in reporting a range of values for a given percentile need not necessarily increase.

Nevertheless, should further precision be required, or requested, the range of values initially determined for a requested percentile can be refined into a more accurate value via further processing of the relevant collection of data. In one embodiment, the entries within the relevant data collection can be sorted, and the entry relevant to the requested percentile can be identified. In an alternative embodiment, a linear progression of values can be assumed, and the requested percentile can be determined based on such a progression. In a still further alternative embodiment, an average can be taken of the upper and lower bounds of the relevant collection of data.

Figure 3:
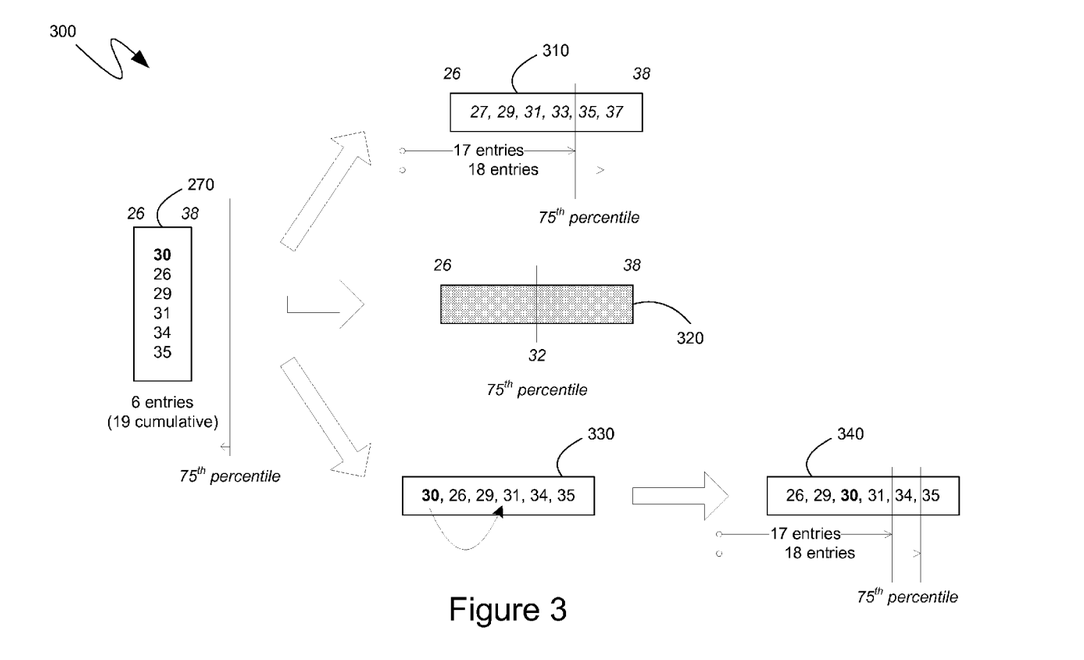
FIG. 3 is a block diagram illustrating a more detailed calculation of percentile values using collections of data.

Turning to FIG. 3, various ones of the contemplated embodiments are illustrated by data collections 300, including, specifically, the data collection 270 of FIG. 2. Continuing with the prior example of determining a seventy-fifth percentile value, an initial determination, as described in detail above, can identify the collection of data 270 as comprising a data entry corresponding to the seventy-fifth percentile and can, as a result return a range of values from 26 to 38 as the seventy-fifth percentile value. In one embodiment, such a range can be refined to a specific number by simply averaging the endpoints of the range. Thus, as illustrated in FIG. 3, data collection 270 can be treated as a single entity 320, as opposed to multiple data entries, and a single value of 32 can be assigned to the entry 320, representing the average of the lower bound of 26 and the upper bound of 38. In appropriate situations, the efficiency with which such an average can be calculated can outweigh potential inaccuracies.

In an alternative embodiment, greater accuracy can be achieved by extrapolating a series of values between the upper and lower bounds of a data collection, such as data collection 270. As indicated previously, the number of data entries within a collection can be maintained. A series of values equivalent in number to the number of data entries can be extrapolated and used as a proxy for the true values, thereby saving the processing effort of sorting the true values.

In one embodiment, a linear extrapolation scheme can be used. For example, as shown in FIG. 3, data collection 310 can be a data collection having the same upper and lower bounds as the relevant data collection 270, and can further comprise six data entries whose values are linearly arranged between the upper and lower bounds. The entries of data collection 310 need not have any relationship to the true entries, as shown in data collection 270, and need only provide estimated values with which a percentile value can be obtained. As indicated previously, for the illustrated example, the eighteenth entry can comprise the seventy-fifth percentile value. Consequently, using the linearly extrapolated values, the eighteenth entry's value of 35 can be determined to be the seventy-fifth percentile value. In an alternative embodiment, the algorithm used to extrapolate values for the data entries within a given collection can be based on more complex mathematical relationships. In a further alternative embodiment, the nature of the data being collected and organized can impact the selection of an appropriate extrapolation algorithm. For example, if the values of the data increase exponentially, then an exponential extrapolation algorithm can be used.

The above described embodiments can be performed without any sorting of new data entries because new data entries are merely appended to the appropriate data collection, and a percentile value is calculated based on a counting of the number of data entries within the collections and, possibly, extrapolations of the data entries' values within a selected collection. However, the sorting of data entries with a data collection may not be computationally expensive or greater accuracy may be required. In such a case, the data entries within a data collection deemed to comprise the relevant data entry for a requested percentile value can be sorted using any known sorting mechanism, such as a bubble sort or a selection sort. Because only a segment of the overall data entries, namely the segment associated with the appropriate data collection, would be sorted, such a sorting can still be significantly more efficient than a sorting of all of the data entries.

Turning back to FIG. 3, data collection 330 illustrates the sorting of a new data entry having a value of 30 among the other data entries of the collection. The resulting sorted data collection 340 can then be used to identify the eighteenth entry, and thereby obtain a value for the seventy-fifth percentile. As illustrated in FIG. 3, the eighteenth entry comprises a value of 34, which can be provided as the seventy-fifth percentile value. The data entry selected in sorted collection 340 can be the same data entry that would have been selected in from the sorted collection 130, except that, rather than sorting all of the data entries shown in collection 340, the above described mechanisms, at worst, sorted only the data entries within the data collection 270.

Figure 4:
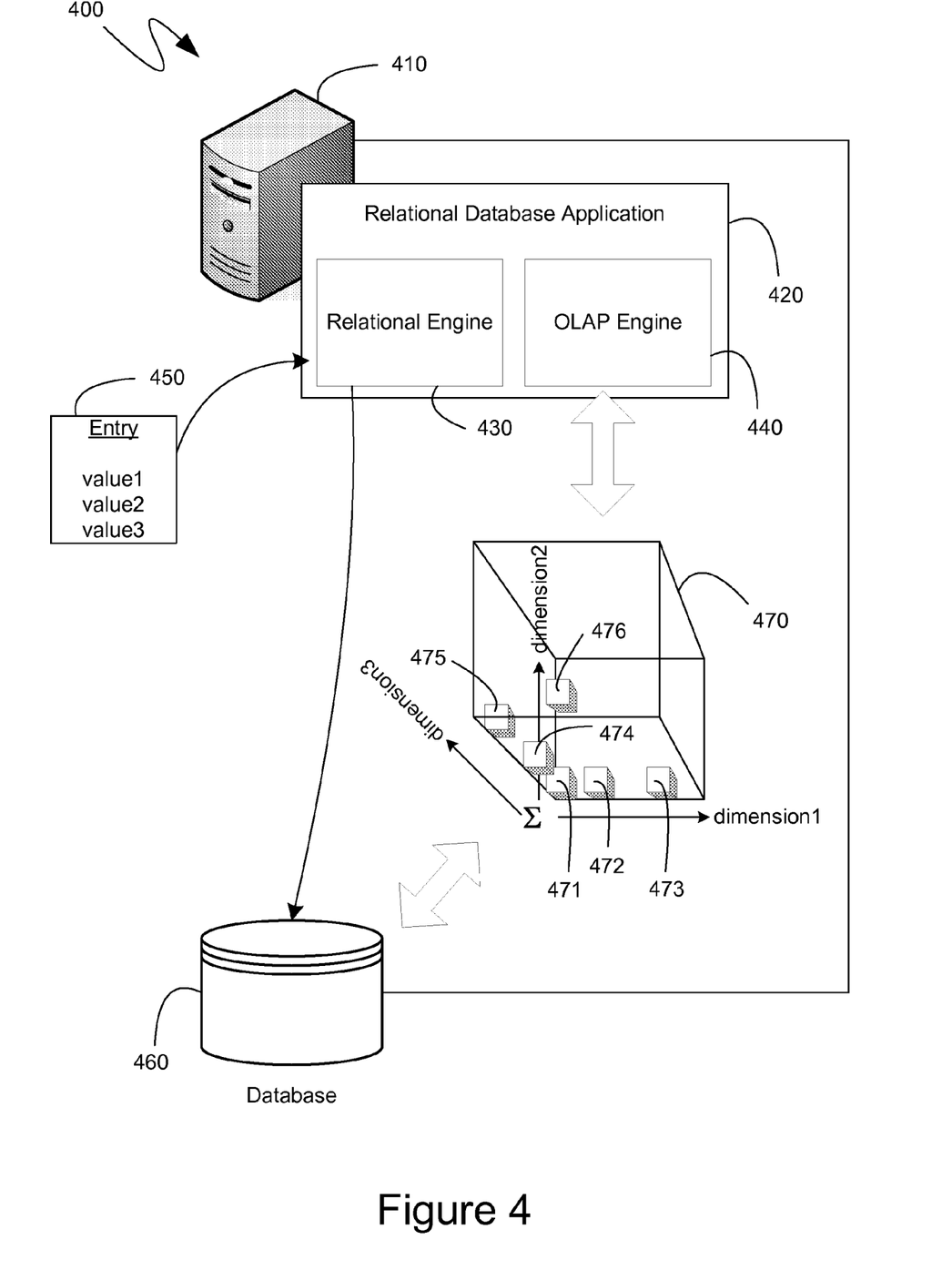
FIG. 4 is a block diagram of the calculation of percentile values using collections of data as maintained by a database.

In one embodiment, the above described mechanisms for efficient determination of percentile values, especially for rapidly changing collections of data, can be implemented by a computing device having access to a database and attendant software tools. Turning to FIG. 4, a block diagram 400 illustrates the analysis described above and performed within the context of a database 460 and a relational database application 420 executing on one or more computing devices, such as the server computing device 410. The relational database application 420 can be a customized database application, or it can be a more traditional database application, and it can comprise both a relational engine 430 and an OLAP engine 440 that can perform the above described aggregation.

As shown, a new data entry 450 can be provided to the relational database application 420, and specifically to the relational engine 430, which can parse the new data entry 450 appropriately, and can store such information within the database 460. While the above examples focused on data entries having only a single dimension, such uni-dimensionality was strictly for the sake of clarity of description, and is in no way to be construed as a limitation of the above described algorithms. To illustrate the application of the above mechanisms to multi-dimensional data entries, the data entry 450 is illustrated as having data in three dimensions. More specifically, along a first dimension, the data entry 450 can have a value generically nominated as "value1" in FIG. 4, while "value2" can represent the data entry's value along a second dimension and "value3" can represent the data entry's value along a second dimension.

For example, the data entry 450 can comprise data regarding the responsiveness of network-based services provided by a corporation, such as a series of World Wide Web (WWW) properties. In such an example, "value1" of data entry 450 can be the web page load time for a particular instance of a customer loading a web page from one of the corporation web properties. Additional information regarding that instance can be reflected in "value2" and "value3". For example, "value2" could identify the particular web page accessed, such as by a numerical code, and "value3" could identify the time of day when the access occurred. Thus, the three dimensions having values in entry 450 include a page load time dimension, a page identifying dimension, and a time of day dimension. Furthermore, much as prior examples were limited to a single dimension for the sake of clarity of description, likewise will the present descriptions and associated diagrams be limited to three dimensions. However, as indicated previously, the described mechanisms and algorithms have no inherent limitation regarding the dimensionality of the processed data. Indeed, data entry 450 could easily comprise further dimensions, indicating, for example, the country from which the request was made, the type of browser making the request, and any other detail that may be relevant to an analysis of a customer's experience at a corporation's web properties.

Data entries, such as data entry 450 can be stored by the relational engine 430 in a database, such as database 460. In addition, each of the values contained within the data entry 450 can be assigned a database field that can be titled appropriately. Once stored in the database 460, data entries, such as data entry 450 can be referenced to provide requested information, including, in particular, percentile values for requested percentiles given specified criteria.

In one embodiment, the above described mechanisms can be implemented with the aid of an aggregation component of the relational database application 420 that is commonly referred to as the "OnLine Analytical Processing (OLAP) engine" 440. The OLAP engine 440 can perform aggregations based on a "multidimensional" database construct, in contrast to the "relationships" present in a relational database. To use the OLAP engine, a set of initial criteria can be established defining the data entries in the database 460. Such initial criteria can include quantum divisions along each relevant dimension can be established. Thus, using the above example, the time of day dimension can be divided into minutes because there is expected to be no reason that any analysis of the data would require the time of day dimension to be parsed more finely that that. Similarly, the page load time dimension can be divided into tenths of seconds, as that can represent the lowest level of granularity that may be required for page load time data. Some dimensions may already comprise natural divisions that can be used. For example, the page identifying dimension can be divided by page identifiers, since there is no smaller unit into which such information can be meaningfully parsed.

A collection of data extending a single quantum along each dimension of an n-dimensional space can be referred to in database theory as a "tuple" or, more colloquially, a "bucket." Using the above example, a bucket can comprise all of the data entries for a particular web page, during a particular minute of the day, each having a page load time within a tenth of a second of one another. Consequently, given the quantization of the individual dimensions, each data entry within a bucket can be considered to be indistinguishable from any other entry in the bucket.

Once the buckets have been set up for the data entries in the database 460, the OLAP engine 440 can aggregate individual data entries within each bucket and maintain a count of the number of entries within the buckets. Thus, as new data entries, such as data entry 450, are added to the database 460 by the relational engine 430, those data entries can be associated with an appropriate bucket, and the OLAP engine 440 can increment the count of that bucket.

In one embodiment, a bucket can correspond to a data collection for purposes of determining percentile values, such as data collections 250, 260, 270 and 240 described above. In such a case, because a bucket can represent a quantum along a given dimension, a determination of the bucket that comprises the entry corresponding to a requested percentile can provide a sufficient level of detail. For example, if a bucket along the page load time dimension was identified as comprising an entry corresponding to a requested percentile, then the range of that bucket, which would be only one tenth of a second, can provide a sufficient level of detail.

In an alternative embodiment, however, a data collection used for purposes of determining percentile values can comprise multiple buckets. Such an arrangement can minimize the number of data collections used for purposes of determining percentile values, and thereby make more efficient the process of adding new data entries to the appropriate data collection. In such a case, the OLAP engine can, not only maintain the count of the number of data entries within each bucket, but can likewise maintain a count of the number of data entries within each collection, which can be determined by aggregating the data entries from the individual buckets that comprise the data collection.

Tuning back to FIG. 4, a data collection 470 is illustrated comprising a range of values along all of the dimensions of the present example. The range of values of the data collection 470 can be greater than the range of any specific bucket and, consequently, the data collection 470 can comprise multiple buckets. For example, continuing with the above example, the data collection 470 can comprise data entries that correspond to web page accesses of any web page on a particular website during business hours and that have a page load time of between one and two seconds. Such a range for the data collection 470 can be ten times greater along the page load time dimension, since each bucket can have a range of only a tenth of a second along the page load time dimension, and can be many times greater along both the time of day and page identifying dimensions, since each bucket can have a range of only a minute along the time of day dimension, and a single web page along the page identifying dimension. The relationship between a data collection and its component buckets is illustrated in FIG. 4 as the data collection 470 comprises three buckets 471, 472 and 473 along the first dimension, an additional bucket 476 along the second dimension, and two other additional buckets 474 and 475 along the third dimension.

In one embodiment, the range of a data collection, such as data collection 470, can be determined in advance by a user based on that user's information gathering criteria. In an alternative embodiment, the range of a data collection can be determined based on an automated process that can suggest, or implement, ranges based on various user inputs, such as the type of information being gathered and the level of detail required. Once the data collections, such as data collection 470, are established, the OLAP engine 440 can maintain, on a continual basis, a counting of, not only the number of data entries within individual buckets, but also of the number of data entries within the established data collections.

Using the counting performed by the OLAP engine, efficient calculation of percentiles along multiple dimensions can be performed. For example, if the system 400 was designed to enable users to track data values corresponding to the first dimension, then such a dimension can be excluded from a user interface, and the user can be allowed to select among the remaining dimensions for defining the percentile value requested. Again returning to the above example, if the system 400 was designed to provide statistics regarding page load times, then such a dimension can be hidden at an initial user interface. Instead the user can be prompted to select among the page identifying dimension and the time of day dimension. For example, the user can be allowed to focus the analysis on a particular web property, thereby limiting the relevant data entries along the second dimension. Or, alternatively, the user may seek to focus the analysis on a particular web property for only business hours, thereby limiting the relevant data entries along both the second and third dimensions.

Once such limits have been established, the OLAP engine can be used to obtain the number of data entries for each data collection having the appropriate limits to the second and third dimensions, but, in one embodiment, encompassing all of the first dimension. Such counts can be used, in the manner described above to provide percentile values for values along the first dimension to a first degree of accuracy. And, as above, should additional accuracy be required, further processing can be performed with respect to a relevant data collection.

If the predefined data collections corresponded to the limits on the second and third dimensions selected by a user, then the count of the data entries within such data collections can have already been performed by the OLAP engine 440. However, if the limits on the second and third dimensions selected by the user did not correspond to predefined data collections, then the existing data collections can be repartitioned along the second and third dimensions, and optionally along the first dimension as well, if appropriate, and the OLAP engine 440 can be invoked to count the number of entries within each repartitioned data collection.

Figure 5:
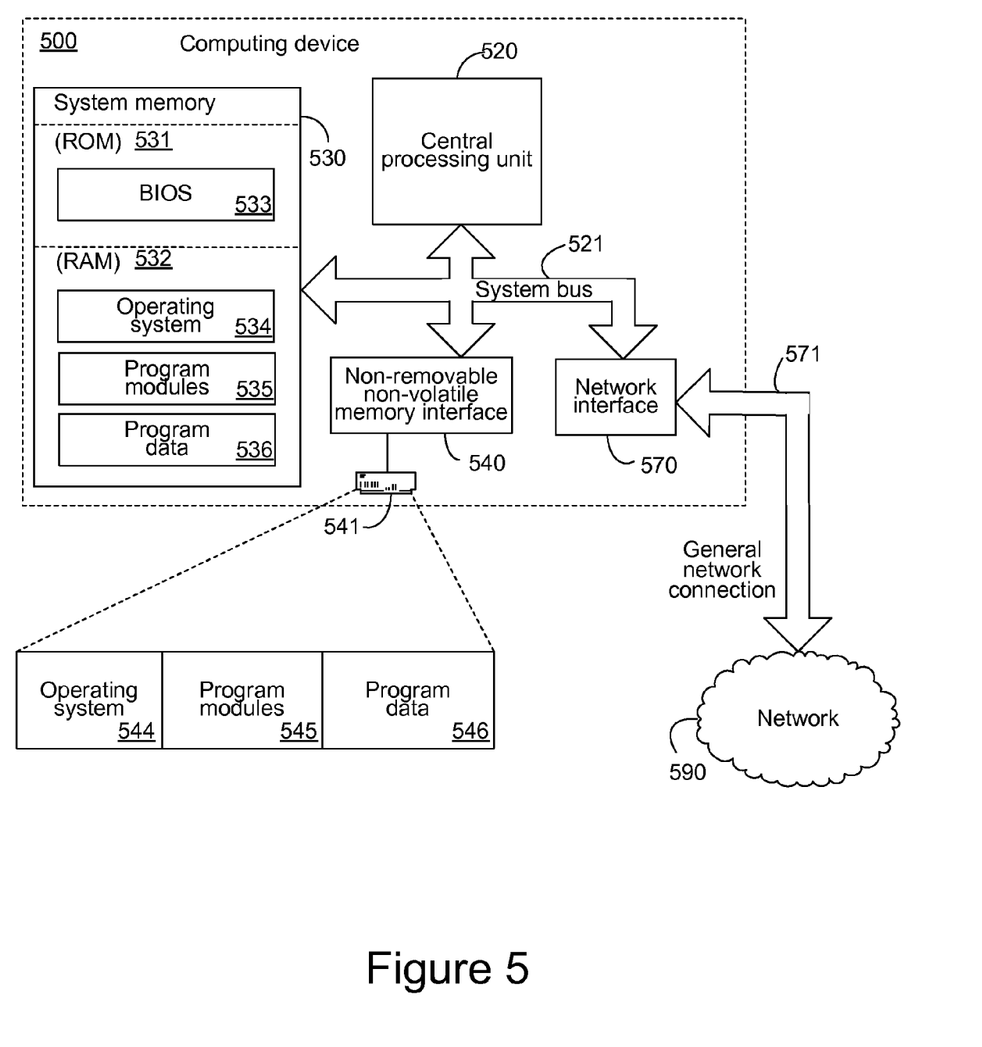
FIG. 5 is a block diagram of an exemplary computing device.

The OLAP engine 440 and, indeed, the entire relational database application 420 can be executed on one or more computing devices, such as computing device 410. Turning to FIG. 5, a computing device, such as the computing device 410 of FIG. 4, is illustrated in greater detail in the form of the exemplary computing device 500. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 2 illustrates an operating system 534, other program modules 535, and program data 536.

The computing device 500 may also include other removable/non-removable, volatile/nonvolatile computer storage media. By way of example only, FIG. 2 illustrates a hard disk drive 541 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540.

The drives and their associated computer storage media discussed above and illustrated in FIG. 2, provide storage of computer readable instructions, data structures, program modules and other data for the computing device 500. In FIG. 2, for example, hard disk drive 541 is illustrated as storing an operating system 544, other program modules 545, and program data 546. Note that these components can either be the same as or different from operating system 534, other program modules 535 and program data 536. Operating system 544, other program modules 545 and program data 546 are given different numbers here to illustrate that, at a minimum, they are different copies.

Of relevance to the descriptions below, the computing device 500 may operate in a networked environment using logical connections to one or more remote computers. For simplicity of illustration, the computing device 500 is shown in FIG. 2 to be connected to a network 90 that is not limited to any particular network or networking protocols. The logical connection depicted in FIG. 2 is a general network connection 571 that can be a local area network (LAN), a wide area network (WAN) or other network. The computing device 500 is connected to the general network connection 571 through a network interface or adapter 570 which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 571. It will be appreciated that the network connections shown are exemplary and other means of establishing a communications link between computing devices may be used.

As can be seen from the above descriptions, mechanisms are provided for the efficient calculation of percentile values, even from among a large and continually changing set of data entries. Collections of data along multiple dimensions can be established in a relational database and existing aggregation mechanisms can be used to provide percentile values to a first degree of accuracy. Greater accuracy can be achieved through further computation comprising the counting and ordering of data entries within an appropriate collection. In view of the many possible variations of the subject matter described herein, we claim as our invention all such embodiments as may come within the scope of the following claims and equivalents thereto.

We claim:

1. One or more computer storage media comprising computer-executable instructions for determining a percentile value of a set of data entries, the computer-executable instructions directed to steps comprising:

dividing the data entries into buckets such that a first data entry, having a first dimension value and additional dimension values, is divided into a first bucket, having a first bucket lower bound and a first bucket upper bound, both along a first dimension and a first bucket lower bound and a first bucket upper bound, both along each of the additional dimensions, if the first dimension value is between the first bucket lower bound and the first bucket upper bound and if the additional dimensional values are each between the first bucket lower bound along each respective additional dimension and the first bucket upper bound along each respective additional dimension;

defining multiple data collections continuously arranged along the first dimension such that a first data collection has a first data collection lower bound and a first data collection upper bound, both along the first dimension;

associating the first bucket with the first data collection if the first bucket lower bound and the first bucket upper bound are both between the first data collection lower bound and the first data collection upper bound;

counting the data entries divided into the buckets;

aggregating, for the multiple data collections, the counted number of data entries for buckets associated with the multiple data collections such that, if the first bucket is associated with the first data collection, then the counted number of data entries divided into the first bucket is also counted for the first data collection;

identifying, based in part on the aggregated number of data entries for the multiple data collections, a total number of data entries in the set of data entries, and a requested percentile, an identified data collection comprising an identified data entry associated with the requested percentile; and determining the percentile value to be a value between an identified data collection lower bound and an identified data collection upper bound, both along the first dimension.

2. The computer storage media of claim 1, wherein the determining the percentile value comprises determining the percentile value to be an extrapolated value associated with the identified data entry, the extrapolated value being based on the identified data collection lower bound, the identified data collection upper bound and an aggregated number of data entries within the identified data collection.

3. The computer storage media of claim 1, wherein the determining the percentile value comprises determining the percentile value to be an identified data entry value associated with the identified data entry, the identified data entry being determined after sorting data entries within the identified data collection according to their associated first dimension values.

4. The computer storage media of claim 1, wherein the defining the multiple data collections comprises selecting the first data collection lower bound along the first dimension and the first data collection upper bound along the first dimension such that a range of values between the first data collection lower bound along the first dimension and the first data collection upper bound along the first dimension is accurate given why the percentile value is being determined.

5. The computer storage media of claim 1, wherein the set of data entries is maintained in a relational database, and wherein further the counting and the aggregating are performed by an OLAP engine provided with a relational database application that manages the relational database.

6. The computer storage media of claim 1 further comprising computer-executable instructions directed to enabling selection of the requested percentile and enabling selection of one or more bounds along dimensions other than the first dimension, wherein the requested percentile is directed to values along the first dimension.

7. The computer storage media of claim 1, wherein the associating, counting, and aggregating are performed for each addition of one or more new data entries to the set of data entries.

8. One or more computer storage media comprising computer-executable instructions providing for the determination of a percentile value of a set of data entries comprising values along multiple dimensions, the computer-executable instructions directed to steps comprising:

providing an interface for requesting a percentile directed to values along a first dimension, the interface enabling selection of one or more bounds along dimensions other than the first dimension;

counting data entries associated with one or more multi-dimensional data collections continuously arranged along each of the multiple dimensions;

identifying, based in part on the counted number of data entries for the one or more multi-dimensional data collections, a total number of data entries in the set of data entries, and a requested percentile, an identified multi-dimensional data collection comprising an identified data entry associated with the requested percentile; and determining the percentile value to be an extrapolated values being based on the counted number of data entries for the identified multi-dimensional data collection and on a lower bound, along the first dimension, of the identified multi-dimensional data collection and an upper bound, along the first dimension, of the identified multi-dimensional data collection.

9. A method for determining a percentile value of a set of data entries comprising the steps of:

utilizing a processing unit to divide the data entries into buckets such that a first data entry, having a first dimension value and additional dimension values, is divided into a first bucket, having a first bucket lower bound and a first bucket upper bound, both along a first dimension and a first bucket lower bound and a first bucket upper bound, both along each of the additional dimensions, if the first dimension value is between the first bucket lower bound and the first bucket upper bound and if the additional dimensional values are each between the first bucket lower bound along each respective additional dimension and the first bucket upper bound along each respective additional dimension;

utilizing a processing unit to define multiple data collections continuously arranged along the first dimension such that a first data collection has a first data collection lower bound and a first data collection upper bound, both along the first dimension;

utilizing a processing unit to associate the first bucket with the first data collection if the first bucket lower bound and the first bucket upper bound are both between the first data collection lower bound and the first data collection upper bound;

utilizing a processing unit to count the data entries divided into the buckets;

utilizing a processing unit to aggregate, for the multiple data collections, the counted number of data entries for buckets associated with the multiple data collections such that, if the first bucket is associated with the first data collection, then the counted number of data entries divided into the first bucket is also counted for the first data collection;

utilizing a processing unit to identify, based in part on the aggregated number of data entries for the multiple data collections, a total number of data entries in the set of data entries, and a requested percentile, an identified data collection comprising an identified data entry, the identified data entry associated with the requested percentile; and utilizing a processing unit to determine the percentile value to be a value between an identified data collection lower bound and an identified data collection upper bound, both along the first dimension.

10. The method of claim 9, wherein the determining the percentile value comprises determining the percentile value to be an extrapolated value associated with the identified data entry, the extrapolated value being based on the identified data collection lower bound, the identified data collection upper bound and an aggregated number of data entries within the identified data collection.

11. The method of claim 9, wherein the determining the percentile value comprises determining the percentile value to be a identified data entry value associated with the identified data entry, the identified data entry being determined after sorting data entries within the identified data collection according to their associated first dimension values.

12. The method of claim 9, wherein the defining the multiple data collections comprises selecting the first data collection lower bound along the first dimension and the first data collection upper bound along the first dimension such that a range of values between the first data collection lower bound along the first dimension and the first data collection upper bound along the first dimension is accurate given why the percentile value is being determined.

13. The method of claim 9, wherein the set of data entries is maintained in a relational database, and wherein further the counting and the aggregating are performed by an OLAP engine provided with a relational database application that manages the relational database.

14. The method of claim 9 further comprising utilizing a processing unit to enable selection of the requested percentile and enable selection of one or more bounds along dimensions other than the first dimension, wherein the requested percentile is directed to values along the first dimension.

15. The method of claim 9, wherein the associating, counting, and aggregating are performed for each addition of one or more new data entries to the set of data entries.

* * * * *